Sept. 15, 1942.　　　　M. C. WIDGER　　　　2,295,766
FIBROUS STRAW BREAKING AND SCUTCHING MACHINE
Filed April 29, 1941　　　5 Sheets-Sheet 1

Max C. Widger, INVENTOR
BY
ATTORNEYS

Sept. 15, 1942.   M. C. WIDGER   2,295,766
FIBROUS STRAW BREAKING AND SCUTCHING MACHINE
Filed April 29, 1941   5 Sheets-Sheet 2

MAX C. WIDGER, INVENTOR
BY
G. J. Kramer
ATTORNEYS

Sept. 15, 1942. M. C. WIDGER 2,295,766
FIBROUS STRAW BREAKING AND SCUTCHING MACHINE
Filed April 29, 1941 5 Sheets-Sheet 3
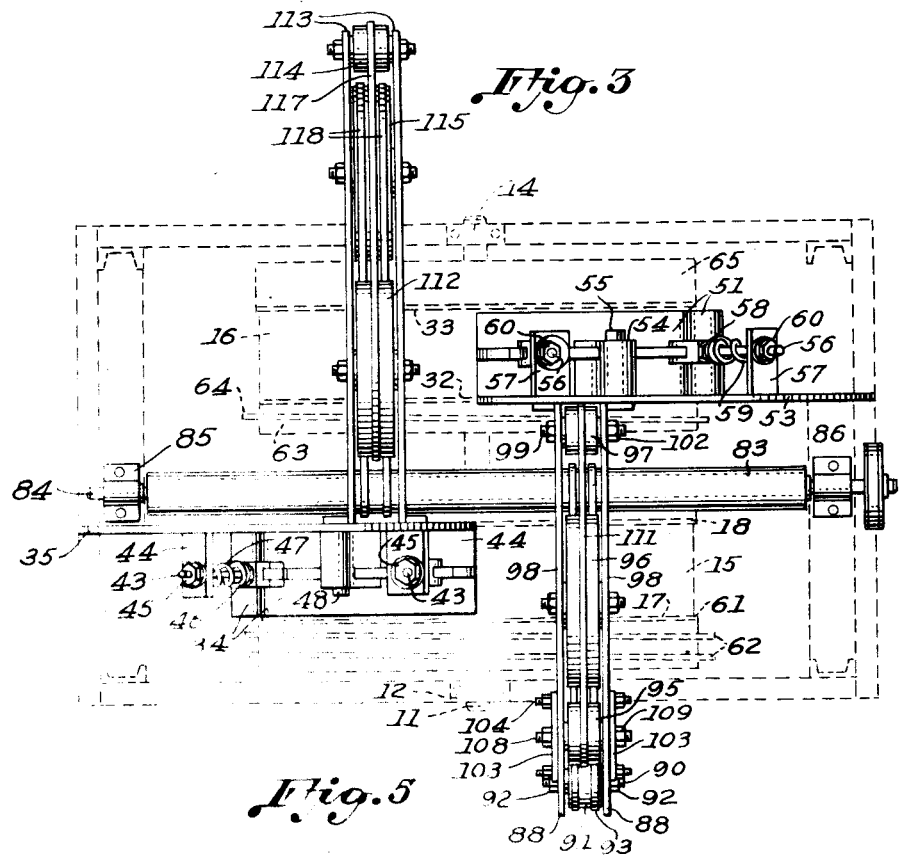
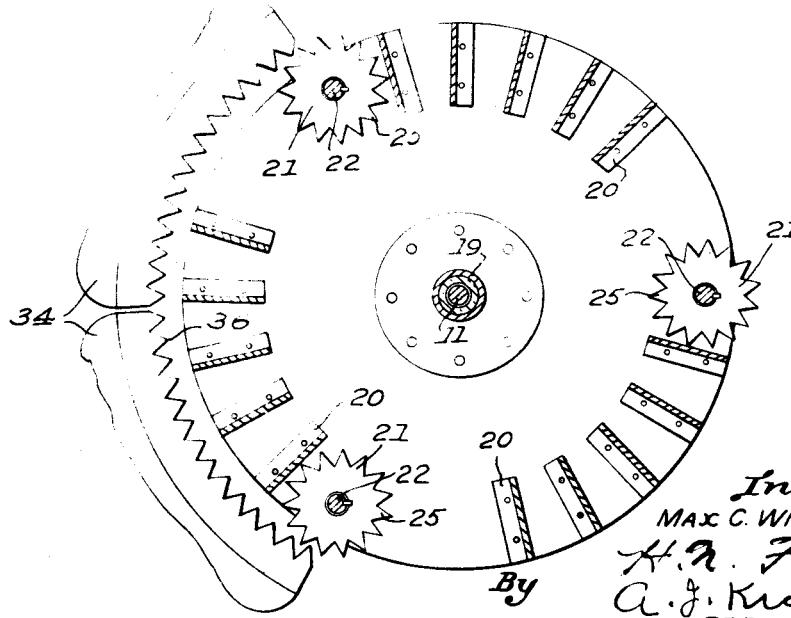
Inventor:
MAX C. WIDGER
By H. A. Foss
A. J. Kramer
Attorneys.

Sept. 15, 1942.  M. C. WIDGER  2,295,766
FIBROUS STRAW BREAKING AND SCUTCHING MACHINE
Filed April 29, 1941  5 Sheets-Sheet 4

MAX C. WIDGER, INVENTOR
BY
ATTORNEYS.

Patented Sept. 15, 1942

2,295,766

UNITED STATES PATENT OFFICE 2,295,766

FIBROUS STRAW BREAKING AND SCUTCHING MACHINE

Max Crocker Widger, Corvallis, Oreg.; dedicated to the free use of the People in the Territory of the United States Application April 29, 1941, Serial No. 390,958

2 Claims. (Cl. 19—12)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to machines for removing the woody portion of flax or other fibrous straw plants of a similar character from the fiber.

The present invention has for an object the provision of a machine which will separate the fiber from the woody portion of the fibrous straw plant efficiently and without injury to the fiber. Another object of this invention is the provision of means for cleaning the fiber with a minimum of tow.

The following description, together with the accompanying drawings, will disclose this invention more fully, its construction and operation of parts and further objects and advantages thereof will be apparent.

In the drawings, which illustrates an embodiment of the invention:

Figure 3 is a plan view, partly in outline;

Figure 5 is a section along the line 5—5 of Figure 2; and

Figure 1:
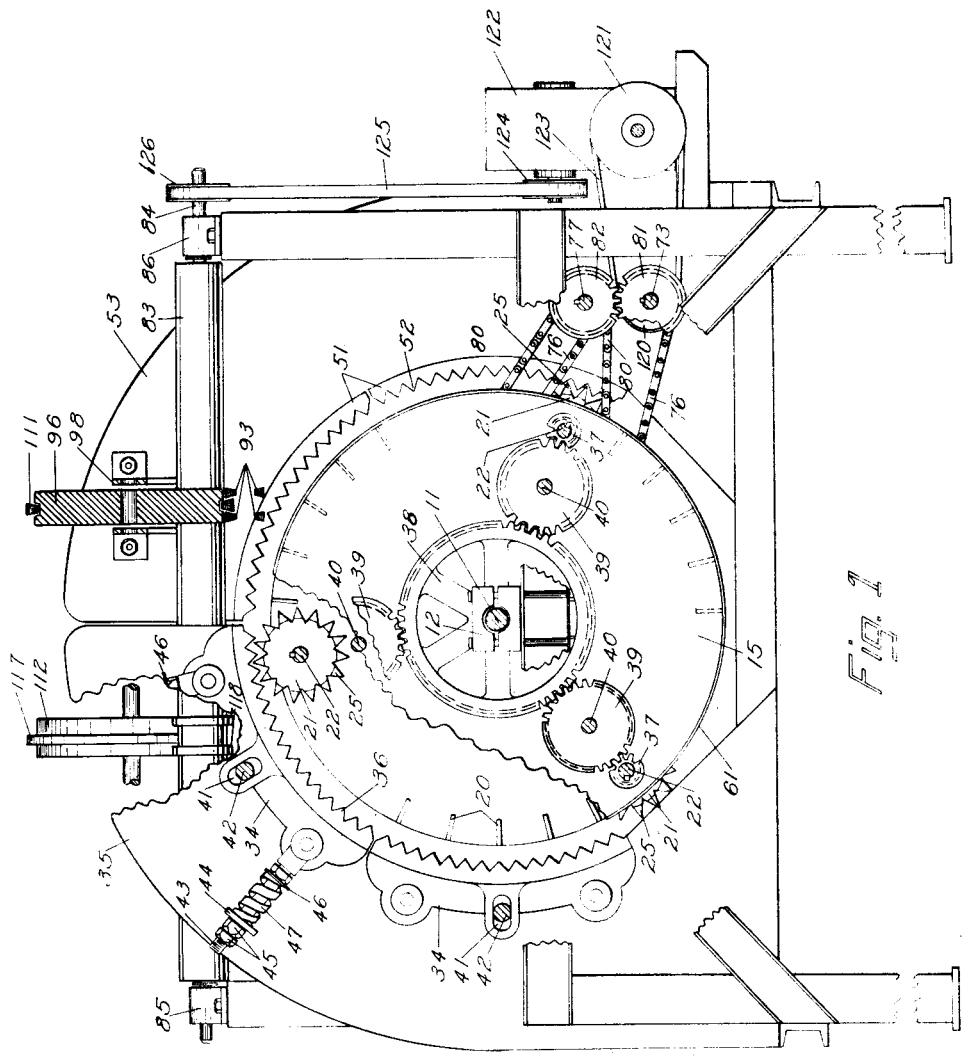
Figure 1 is a front elevational view, partly in section.
Figure 2:
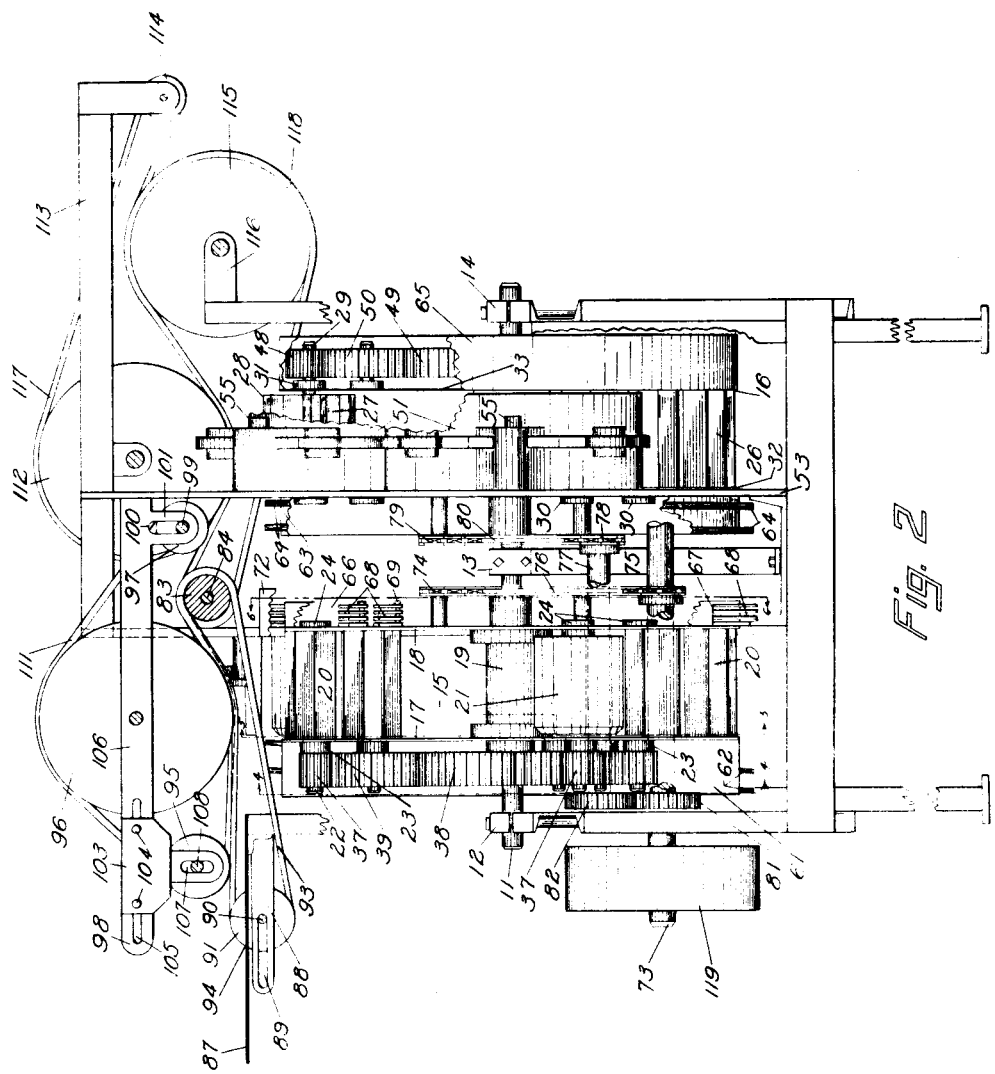
Figure 2 is a side elevational view, partly in section.
Figure 4:
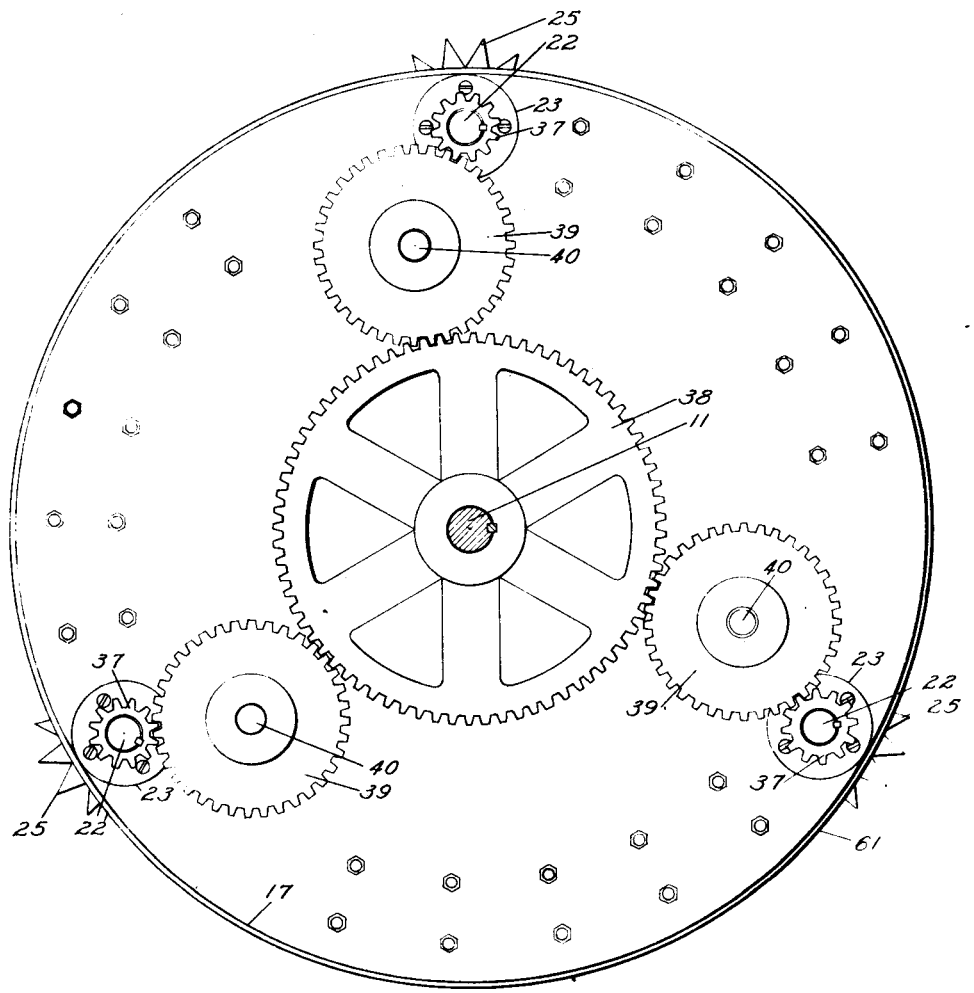
Figure 4 is a section along the line 4—4 of Figure 2.
Figure 6:
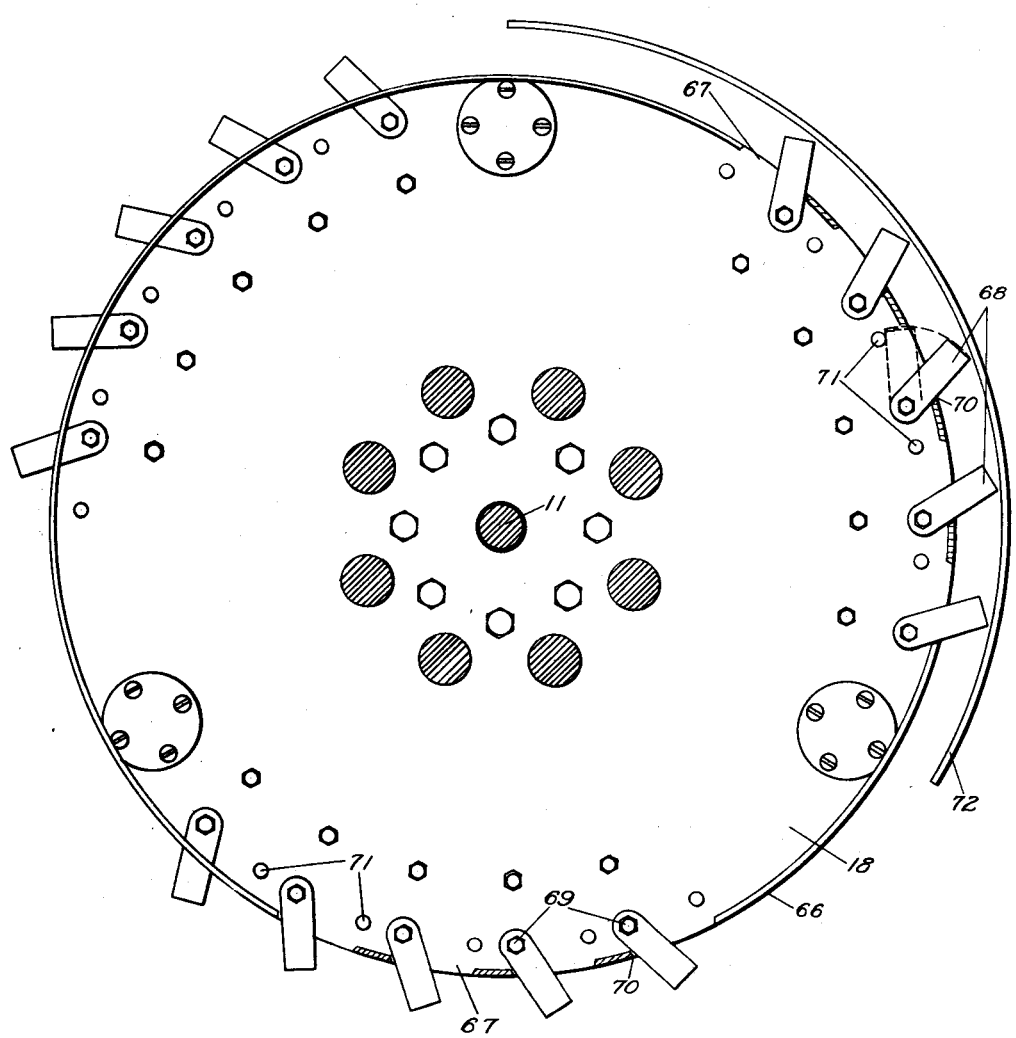
Figure 6 is a section along the line 6—6 of Figure 2.

Referring with more particularity to the drawings in which like numerals designate like parts, the embodiment illustrated is carried by a suitable frame structure, on which is mounted a stationary horizontal shaft 11 in bearings 12, 13, and 14. On the shaft 11 there are rotatably mounted two rotary assemblies 15 and 16, respectively, hereinafter referred to as rotors. These rotors are rotated in opposite directions, the rotor 15 being rotated counter-clockwise, as viewed in Figure 1, and the rotor 16 being rotated in a clockwise direction. The rotor 15 consists of a pair of spaced discs 17 and 18 secured to a hub 19, which hub is rotatable on the shaft 11. Across the discs 17 and 18 a plurality of groups of bars 20 are secured adjacent the periphery of the discs. These bars act to beat the fiber straw after being crimped, as will be hereinafter more fully explained. Between the discs 17 and 18 there is also mounted, forward of each group of bars, a crimping roller 21 on a shaft 22 fixed to the roller, said shaft 22 being rotatably mounted in suitable bearings 23 and 24 in the discs 17 and 18, respectively. On one side, the teeth or flutes 25 of the crimping rollers 21 project beyond the peripheries of the discs 17 and 18.

The rotor 16 is provided with bars 26 similar to the bars 20 and with similar crimping rollers 27, having teeth or flutes 28, on shafts 29 rotatable in bearings 30 and 31 of spaced discs 32 and 33.

Adjacent that side of the rotor 15, which, in normal operation, moves downward, arcuated segments 34 are disposed on a fixed frame member 35. The segments 34 are placed from the rollers 21, and the teeth 36 of said segments, which are on the concave side thereof, mesh with the spaces between the teeth 25 of the crimping rollers 21 without contact so that fiber straw placed between the teeth 36 and the teeth 25 become crimped without rupture. To maintain the teeth 25 of the rollers 21 in this relation with respect to the teeth 36, the shafts 22 of the crimping rollers 21 are extended through their respective bearings 23 in the disc 17 and are each secured to a pinion gear 37. A gear 38 is fixed to the stationary shaft 11 and is connected to each of the gears 37 by an idling gear 39, each meshing with the gear 38 and one of the gears 37. The idling gears are rotatably mounted on shafts 40 projecting from the disc 17. The segments 34 are provided at the middle with radial slots 41 and are mounted on pins 42 which engage said slots, said pins being fixed to the frame of the machine. This permits a degree of adjustability with respect to the rotor 15. The segments 34 are held in adjusted position by means of bolts 43 pivotally engaging the ends of each segment, passing through abutment brackets 44, and having adjusting nuts 45. The bolts 43 are each provided with an abutment 46 and a spring 47 is compressibly mounted between said abutment and the bracket 44. By changing the position of the nuts 45, the segments 34 can be radially adjusted with respect to the crimping rollers 21. The springs also serve to cushion the crimping operation.

Similarly, the shafts 29 of the crimping rollers 27 of the rotor 16 extend through bearings 31 of disc 33 to receive pinion gears 48 geared to a stationary gear 49 on the shaft 11 by means of idling gears 50. Also arcuated segments 51, similar to the segments 34, and having teeth 52, are mounted on a frame member 53, adjacent the rotor 16 and crimping rollers 27, but on the side of the machine opposite the segments 34, by means of slots 54, pins 55, bolts 56, brackets 57, abutments 58, springs 59, and adjustable nuts 60 similar to those associated with the segments 34.

The gears 37, 38, and 39, projecting outwardly from the disc 17, are provided with a housing shield in the form of a drum 61 secured to the disc 17. The periphery of the drum 61 is provided with one or more turns of a conveyor screw fin 62 which is adapted to engage the fiber straw and move it into the machine between the rotor 15 and the teeth 36. On the rotor 16, a similar drum 63 is attached to the disc 32 and it is also provided with one or more turns of a conveyor screw fin 64 for conveying the straw through the machine between the rotor 16 and the teeth 52 after it leaves the rotor 15. The gears 48, 49, and 50, of the rotor 16 projecting from the disc 33 are provided with a drum housing 65. The rim of this drum is smooth and the straw simply slides over it as it leaves the machine.

The rotor 15 is provided with comb-cleaning units attached to the outer side of the disc 18. These units operate through a drum 66 fixed to the disc 18 and having substantially the same diameter. This drum is provided with a number of axial slots 67, through each of which a combing unit 68 projects in normal operation. The inner ends of the combing units each swing on a pin 69 fixed to the disc 18. The slots 67 are wide enough to permit the combing units to swing about their respective pins to a retracted position within the drum 66 and to permit them to swing out through the slot by centrifugal force and abut the leading edge 70 of each slot in a position short of being radial. In the retracted position, the combing units 69 abut pins 71 fixed to the disc 18.

Along the quadrant where the combing units normally contact the fiber straw, a stationary shield 72 is fixed to the frame of the machine with a small amount of clearance between the shield and the ends of the combing units when these units are in their extreme protracted position.

A powered shaft 73 is rotatably mounted on the frame of the machine parallel to the shaft 11. A sprocket 74 is fixed to the rotor 15 and a sprocket 75, aligned with the sprocket 74, is fixed to shaft 73, said sprockets being connected by a chain 76. Another shaft 77 is mounted adjacent and parallel to the shaft 73 and carries a sprocket 78 aligned with a sprocket 79 fixed to rotor 16, these sprockets being connected by a chain 80. The shaft 77 is powered from the shaft 73, but in an opposite direction by means of meshing gears 81 and 82 fixed to the shafts 73 and 77, respectively.

On top of the machine there is disposed a system of belts and pulleys for conveying the straw over the rotors. This system is built around a roller 83 extending transversely from one side of the machine to the other on a shaft 84, rotatably mounted in suitable bearings 85 and 86, and disposed between the rotors 15 and 16 adjacent the vertical plane of the disc 18. Adjacent the other end of the rotor 15, that is, on the intake side of the machine, a table 87 is provided on which the fiber straw is placed and prepared for delivery into the machine. Beneath this table, structural members 88 are secured, each having a horizontal slot 89, in which slots the ends of a shaft 90 of a pulley 91 are rotatably mounted. The shaft 90 is threaded on the ends and provided with nuts 92 for adjusting the position of the shaft 90 in the slots 89. The pulley 91 carries two spaced belts 93, which belts also travel over and around the roller 83 and return to the pulley 91. The pulley 91 projects upward through an opening 94 in the table 87. The arrangement is such that the belts 93 are vertically over the rotor 15 on the side of the rotor opposite the one associated with the segments 34.

In contact with the upper sides of the belts 93, there are disposed two tandem pulleys 95 and 96 between the pulley 91 and the roller 83. The pulley 95 is near the pulley 91 and of about the same diameter, and the pulley 96 is near the roller 83 and is relatively large in diameter. On the other side of the roller 83, another pulley 97, like the pulley 95, is disposed. The pulleys 95, 96, and 97 are all mounted on a pair of laterally spaced longitudinal structural frame members 98. The shaft 99 of the pulley 97 is disposed in vertical slots 100 of the structural members 98 to permit vertical adjustment and is held in position by means of nuts 102 threaded on the ends of the shaft. The pulley 95 is provided with horizontal and vertical adjusting means comprising T-brackets 103 with laterally extending pins 104 slidably disposed in horizontal slots 105 of the structural members 98 and a vertical bearing slot 107 in each of the brackets 103 for the ends of the shaft 108 of the pulley 95. The shaft 108 and the pins 104 are threaded at the ends to receive nuts 109 and 110, respectively, to hold them in position in their respective slots. A belt 111 circuits the pulleys 95, 96, and 97 and extends from the bottom of the pulley 95 between the belts 93 to the bottom of the pulley 96, thence over the roller 83 under the pulley 97, thence, reversing direction, over the pulley 97, around the top of the pulley 96 and returning to the pulley 95. This unit is for gripping the flax and conveying one end through the rotor 15 and over the roller 83. A second unit is provided with respect to the rotor 16 to receive the straw as it is conveyed over the roller 83, to grip it and convey the other end of the straw through the rotor 16. This second unit comprises a pulley 112 adjacent the roller 83 over the rotor 16 on the side opposite the segments 51. The pulley 112 is rotatably mounted between horizontal frame members 113. Between the forward ends of the frame members 113, another pulley 114 is rotatably mounted. Between the pulleys 112 and 114, the pulley 115 is rotatably mounted on a structural member 116, substantially as illustrated. A belt 117 travels around the pulley 112 over the pulley 115, around the pulley 114 and thence back to the pulley 112. A pair of spaced belts 118 travel from the the roller 83 beneath the pulley 112 to the pulley 115, where they straddle the lower side of the belt 117, and thence travel around the pulley 115 and back to the roller 83.

All of the belts are preferably of the V-type and, in the usual manner, appropriate groovings are provided in the pulleys supporting them to prevent slippage.

Power is applied from a motor (not shown) to a pulley 119 fixed to shaft 73 to drive both rotors 15 and 16. A pulley 120 is fixed to shaft 73 and geared to pulley 121 on the high speed side of a speed reducer 122 by means of a belt 123. The take-off of the speed reducer is provided with a pulley 124 which is geared, by means of a belt 125 to a pulley 126 fixed to the shaft 84 of the roller 83.

In operation, the straw is prepared in a thin layer on the table 87 and is fed to the machine so that it is gripped near the root ends between belts 111 and 93, which belts carry the straw forward with the seed or tip ends on the same side of the machine as the segments 34. As the straw is carried forward, the seed ends engage the screw fin 62, which carries them over the rotor 15 between the segments 34 and the crimping rollers 21. Moving forward, the straw is alternately crimped by the rollers 21 and straightened by the beaters 20. Due to the circular path through which the straw moves as it is conveyed from the pulley 96 to the roller 83, the fiber straw is crimped at different points upon successive engagement with the crimping rollers 21. This results in a thorough scutching of the seed ends of the fiber straw.

After the straw passes from the space between the crimping rollers 21 and the segments 34, it then passes between the shield 72 and drum 66 where it is engaged by combing units 68. These units comb out any remaining shives and straighten the fiber before proceeding to the rotor 16.

The straw then passes over the roller 83 where the root ends are released at the point where the belts 111 and 93 part, and the seed ends which have now been completely scutched are gripped between the belts 118 and 117. The root ends then drop on the conveyor fin 64 which leads them over the rotor 16 between the segments 51 and the crimping rollers 27 while the scutched ends are being conveyed forward between and by the belts 118 and 117. On the rotor 16, the root ends of the fiber straw receive the same treatment as the seed ends in the rotor 15 and in substantially the same manner except that combing units, like those in the rotor 15, are not provided. On leaving the rotor 16, the fiber slides off the arm 65 and is conveyed over the pulley 115, where it is released at the point of separation of the belts 118 and 117, and is then collected for further processing.

Having thus described my invention, I claim:

1. A machine of the character described comprising a rotor having fluted rollers rotatably mounted near the periphery, a fluted arc disposed adjacent the periphery of said rotor to mesh with the spaces between the flutes of said rollers, means for conveying the ends of fiber straw over the periphery of said rotor between said arc and said rollers, bars fixed to said rotor on the periphery thereof between said rollers, and a plurality of combing units hinged to said rotor to engage the fiber which has passed said rollers.

2. A machine of the character described comprising a first rotor and a second rotor, each having fluted rollers rotatably mounted near the periphery thereof and a fluted arc disposed adjacent the periphery of each rotor to mesh with the spaces between the flutes of said rollers, bars fixed to each of said rotors on the peripheries thereof between the rollers, a plurality of combing units hinged to said first rotor to engage the fiber straw which passes thereover, means associated with the first rotor for gripping one end of the fiber straw and conveying it so that the other end passes between the periphery of the first rotor and its adjacent arc, and means associated with the second rotor for gripping the other end of the fiber straw as it leaves said combing units and conveying it so that the opposite end passes between the periphery of the second rotor and its adjacent arc.

MAX CROCKER WIDGER.